(12) United States Patent
Kawai et al.

(10) Patent No.: US 7,612,907 B2
(45) Date of Patent: Nov. 3, 2009

(54) PRINTING APPARATUS, PRINT CONTROL METHOD, COMPUTER-READABLE RECORDING MEDIUM FOR STORING PROGRAM, AND PROGRAM

(75) Inventors: Yoshinori Kawai, Kawasaki (JP); Naoki Sumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 789 days.

(21) Appl. No.: 11/103,274

(22) Filed: Apr. 11, 2005

(65) Prior Publication Data
US 2005/0231745 A1 Oct. 20, 2005

(30) Foreign Application Priority Data

Apr. 16, 2004 (JP) ............................. 2004-121230
Feb. 9, 2005 (JP) ............................. 2005-032423

(51) Int. Cl.
*G06K 15/02* (2006.01)

(52) U.S. Cl. ...................... 358/1.18; 358/1.1; 358/1.12

(58) Field of Classification Search ................ 358/1.12, 358/1.18; 348/207.1
See application file for complete search history.

(56) References Cited

U.S. PATENT DOCUMENTS 6,310,640 B1 * 10/2001 Askeland ...................... 347/41
2004/0150687 A1 * 8/2004 Matsuyama .................. 347/16
2005/0225586 A1 * 10/2005 Brenner ....................... 347/19

FOREIGN PATENT DOCUMENTS

JP 11-308470 A 11/1999
JP 2002-368994 A 12/2002

\* cited by examiner

*Primary Examiner*—King Y Poon
*Assistant Examiner*—Kent Yip
(74) *Attorney, Agent, or Firm*—Canon U.S.A. Inc., I.P. Division

(57) ABSTRACT

A printing apparatus determines the print orientation of an image so that a degraded print quality area is located at the bottom of the image and prints the image based on the determined orientation so as to decrease print quality degradation caused by the print characteristics of a printer associated with paper feed.

21 Claims, 14 Drawing Sheets

FIG. 3

| PAPER TYPE | MARGIN | PAPER FEED PRECISION IN BORDERLESS PRINTING | PERFORATION |
|---|---|---|---|
| GLOSSY PAPER, A4 SIZE, FINE | SAME SIZE AT LEADING EDGE AND TRAILING EDGE | THE SAME AT LEADING EDGE AND AT TRAILING EDGE | NOT SUPPORTED |
| GLOSSY PAPER, A4 SIZE, NORMAL | WIDER AT TRAILING EDGE THAN AT LEADING EDGE | WORSE AT TRAILING EDGE THAN AT LEADING EDGE | NOT SUPPORTED |
| GLOSSY PAPER, L SIZE | WIDER AT TRAILING EDGE THAN AT LEADING EDGE | WORSE AT TRAILING EDGE THAN AT LEADING EDGE | SUPPORTED AT TRAILING EDGE AREA |
| MATTE PAPER, A4 SIZE | WIDER AT LEADING EDGE THAN AT TRAILING EDGE | WORSE AT LEADING EDGE THAN AT TRAILING EDGE | NOT SUPPORTED |
| MATTE PAPER, L SIZE | WIDER AT TRAILING EDGE THAN AT LEADING EDGE | WORSE AT TRAILING EDGE THAN AT LEADING EDGE | SUPPORTED AT TRAILING EDGE AREA |
| REGULAR PAPER, A4 SIZE | SAME SIZE AT LEADING EDGE AND TRAILING EDGE | WORSE AT TRAILING EDGE THAN AT LEADING EDGE | NOT SUPPORTED |

FIG. 6

| PAPER TYPE | DEGRADED PRINT QUALITY AREA |
|---|---|
| GLOSSY PAPER, A4 SIZE, FINE | NONE |
| GLOSSY PAPER, A4 SIZE, NORMAL | 1 CM FROM TRAILING EDGE |
| GLOSSY PAPER, L SIZE | 2 CM FROM TRAILING EDGE |
| MATTE PAPER, A4 SIZE | 1CM FROM LEADING EDGE |
| MATTE PAPER, L SIZE | 2 CM FROM LEADING EDGE AND TRAILING EDGE |
| REGULAR PAPER, A4 SIZE | 2 CM FROM LEADING EDGE AND TRAILING EDGE |

FIG. 8

| DIRECTORY INFORMATION |
|---|
| FIRST DATA PROCESSING PROGRAM PROGRAM CODE GROUPS CORRESPONDING TO STEPS OF FLOW CHART IN FIG. 4 |
| SECOND DATA PROCESSING PROGRAM PROGRAM CODE GROUPS CORRESPONDING TO STEPS OF FLOW CHART IN FIG. 7 |

PRINTING APPARATUS, PRINT CONTROL METHOD, COMPUTER-READABLE RECORDING MEDIUM FOR STORING PROGRAM, AND PROGRAM

BACKGROUND OF THE INVENTION

1. Field of the Invention

The present invention relates to a printing apparatus, a print control method, a computer-readable recording medium for storing a program, and a program, all of which provide an optimal printing result in accordance with a print characteristic about a paper feed direction of a printer when printing, for example, images captured by digital cameras.

2. Description of the Related Art

Recently, with the development and the widespread use of digital cameras and printers, an environment where users easily print image data using digital cameras and printers has been available. In such printers, a printable area in a normal mode is set for each feedable paper size in advance. The printers carry out processing on image data to print it in that printable area.

In general, a printer of a serial type has bad paper feed precision at the leading and trailing edges of a sheet of print paper. Accordingly, when an engine unit of the printer prints image data from an application, an area outside the printable area becomes a margin in a printout.

Recently, printers that can print beyond a printable area to provide borderless printing have been developed. In order to print an image outside the printable area, these printers slow down the paper feed at the leading and trailing edge areas of the print sheet, where the paper feed precision is degraded, compared to other areas of the print sheet.

Printers that cannot ensure the paper feed precision at the leading and trailing edge areas of the print sheet employ paper having a perforation. Tearing off the paper along the perforation after printing results in borderless printing.

Additionally, Japanese Patent Laid-Open No. 11-308470 discloses that, to prevent a major part of a print image from being missing, the major part is detected and the print size or print area is changed.

In some cases, for a printable area of such printers, a margin at the leading edge of a print sheet is different from that at the trailing edge with respect to print orientation of the print sheet. The margin at the trailing edge is usually wider than that at the leading edge. This difference is sometimes visually noticeable in a printout.

FIGS. 9 and 10 are diagrams of printout images printed by such printers. In the drawings, illustrations in line drawing represent image data.

FIGS. 9 and 10 illustrate an entire paper area 801, an effective print area 802, a border area 803, and a subject 804.

FIG. 9 shows the case where a wider margin is located at the bottom of a print image, whereas FIG. 10 shows the case where a wider margin is located at the top of the print image. As can be seen, when the margins at the top and bottom are different in printing, users generally have an impression that a wider margin at the bottom is visually less noticeable than a wider margin at the top.

When carrying out borderless printing, some printers slow down the paper feed at the leading and trailing edge areas of the print sheet where the paper feed precision is degraded so as to ensure the precision. However, if the printers fail to ensure the precision compared to that in the center area of the print sheet, some print defects, such as a little streaking, appear in printouts.

In particular, the print defects tend to occur at the trailing edge area. Although there is only a little streaking, users usually feel dissatisfied with the print quality when looking at the whole printout image. For example, FIGS. 11 and 12 show the printouts of this case.

FIGS. 11 and 12 are diagrams illustrating printout images printed by printers of this type. In the drawings, the identical elements to those illustrated and described in relation to FIGS. 9 and 10 are designated by the identical reference numerals. FIG. 11 shows the case where a degraded print quality area is located at the bottom of a print image, whereas FIG. 12 shows the case where a degraded print quality area is located at the top of the print image.

FIGS. 11 and 12 show a degraded print quality area 1001, where print defects, such as streaking or banding, occur.

As can be seen, users generally feel that a degraded print quality area located at the bottom of the print image is visually less noticeable than a degraded print quality area located at the top of the print image.

When carrying out borderless printing on paper having a perforation, a tear-off edge remains at the perforation after tearing off a paper stub. If an area where the paper feed precision is not ensured is located at either top or bottom of the print image, a perforation at only one side of paper is sufficient. However, users usually feel dissatisfied when only one tear-off edge is at one side of the paper. FIGS. 13 and 14 show the printouts of this case.

FIGS. 13 and 14 illustrate printout images printed by printers of this type. In the drawings, the identical elements to those illustrated and described in relation to FIGS. 9 and 10 are designated by the identical reference numerals.

In FIGS. 13 and 14, a tear-off edge 1201 is shown. FIG. 13 shows the case where the tear-off edge 1201 is located at the bottom of a print image, and FIG. 14 shows the case where the tear-off edge 1201 is located at the top of the print image. Users generally feel that the tear-off edge 1201 at the bottom is visually less noticeable than the tear-off edge 1201 at the top.

As described above, printers have print characteristics associated with the paper feed direction. The print characteristics have an impact on the quality of printouts. However, current print systems do not consider the print characteristics in printing, and therefore, streaking sometimes occurs at the top of the print image. A wider margin is sometimes located at the top of the print image. Also, a perforation is sometimes located at the top of the print image. These negative visual effects must be decreased.

Additionally, if, in borderless printing, a degraded print quality area including a little streaking caused by degraded paper feed precision overlaps a subject image area, the subject image exhibits the print defect. Users usually complain about this type of printout. In contrast, users have little complaint about a printout if the print defect is located outside the subject image, although the print defect still remains.

From another point of view, a frequency characteristic is one of the human visual characteristics. In general, as the frequency becomes higher, recognition of noise decreases except the case where the frequency is extremely low. If this fact is applied to a little streaking caused by degraded paper feed precision in printing, noise, such as streaking, is hard to recognize at an area having a high spatial frequency, that is, the noise is not noticeable.

As described above, the positional relationship between a degraded print quality area due to the paper feed precision of a print engine unit and a subject area produces, in a printout, a print area having the quality lower than user's expectation. As a result, total print quality of the printout does not satisfy the user, which is a problem.

SUMMARY OF THE INVENTION

The present invention provides a printing apparatus, a printing control method, a computer-readable recording medium for storing a program, and a program for reducing print defects due to print characteristics associated with paper feed of a printer. To reduce the print defects, the printing apparatus, printing control method, computer-readable recording medium, and program analyze paper feed characteristics associated with a fed paper type based on the settings of print conditions and the print characteristics, analyze input image data to determine the orientation of the image, and then determine the print orientation of the image data with respect to a fed sheet of paper based on the results of the analysis and the determination. Thereafter, the printing apparatus, printing control method, computer-readable recording medium, and program generate, from the image data, print image data to be output to the print engine unit based on the determined print orientation so that, when printing the image data under the settings of print conditions, the image data is printed in an area where print defects are not noticeable while considering margins at the leading and trailing edges of the fed paper and the orientation of the image data.

The present invention also provides a printing apparatus, a printing control method, a computer-readable recording medium for storing a program, and a program for reducing print defects due to print characteristics associated with paper feed of a printer. To reduce the print defects, the printing apparatus, printing control method, computer-readable recording medium, and program analyze a degraded print quality area present on a print sheet based on the settings of print conditions and the paper feed precision information in the print characteristics, analyze input image data to determine the subject area, and then determine the overlap between the subject area and the degraded print quality area based on the results of the analysis and the determination. Thereafter, the printing apparatus, printing control method, computer-readable recording medium, and program determine the print orientation of the subject and generate, from the image data, print image data to be output to a printing unit based on the determined print orientation so that, when printing the image data under the settings of print conditions, the subject in the image data is printed in an area where print defects are not noticeable even though the degraded print quality area due to the print characteristics associated with paper feed of the printer overlaps the subject in the image.

According to an aspect of the present invention, a printing apparatus includes a first determination unit for analyzing an input image and determining a print orientation of the image, and a printing unit for printing the image based on the print orientation determined by the first determination unit.

According to another aspect of the present invention, a printing apparatus includes a first determination unit for analyzing an input image and determining a print orientation of the image so that a rate that a subject area of the image is included in a degraded print quality area is minimized. The printing apparatus further includes a printing unit for printing the image based on the print orientation determined by the first determination unit.

According to another aspect of the present invention, a printing apparatus includes a first determination unit for analyzing an input image and determining a print orientation of the image so that a degraded print quality area is located at a higher special frequency side of the image. The printing apparatus further includes a printing unit for printing the image based on the print orientation determined by the first determination unit.

Further features and advantages of the present invention will become apparent from the following description of exemplary embodiments with reference to the attached drawings.

BRIEF DESCRIPTION OF THE DRAWINGS

FIG. 3 shows an example of print characteristic information attributable to an engine unit and stored in a storage unit of a host computer shown in FIG. 1.

FIG. 6 shows an example of a print characteristic information table illustrating a relationship between a paper type and a degraded print quality area, which are stored in a print characteristics holding unit shown in FIG. 5.

FIG. 8 is a diagram illustrating a memory map of a recording medium for storing various types of data processing programs readable by the printing apparatus according to the present invention.

DESCRIPTION OF THE EMBODIMENTS

Embodiments of the present invention will be described below with reference to the accompanying drawings.

First Embodiment

Figure 1:
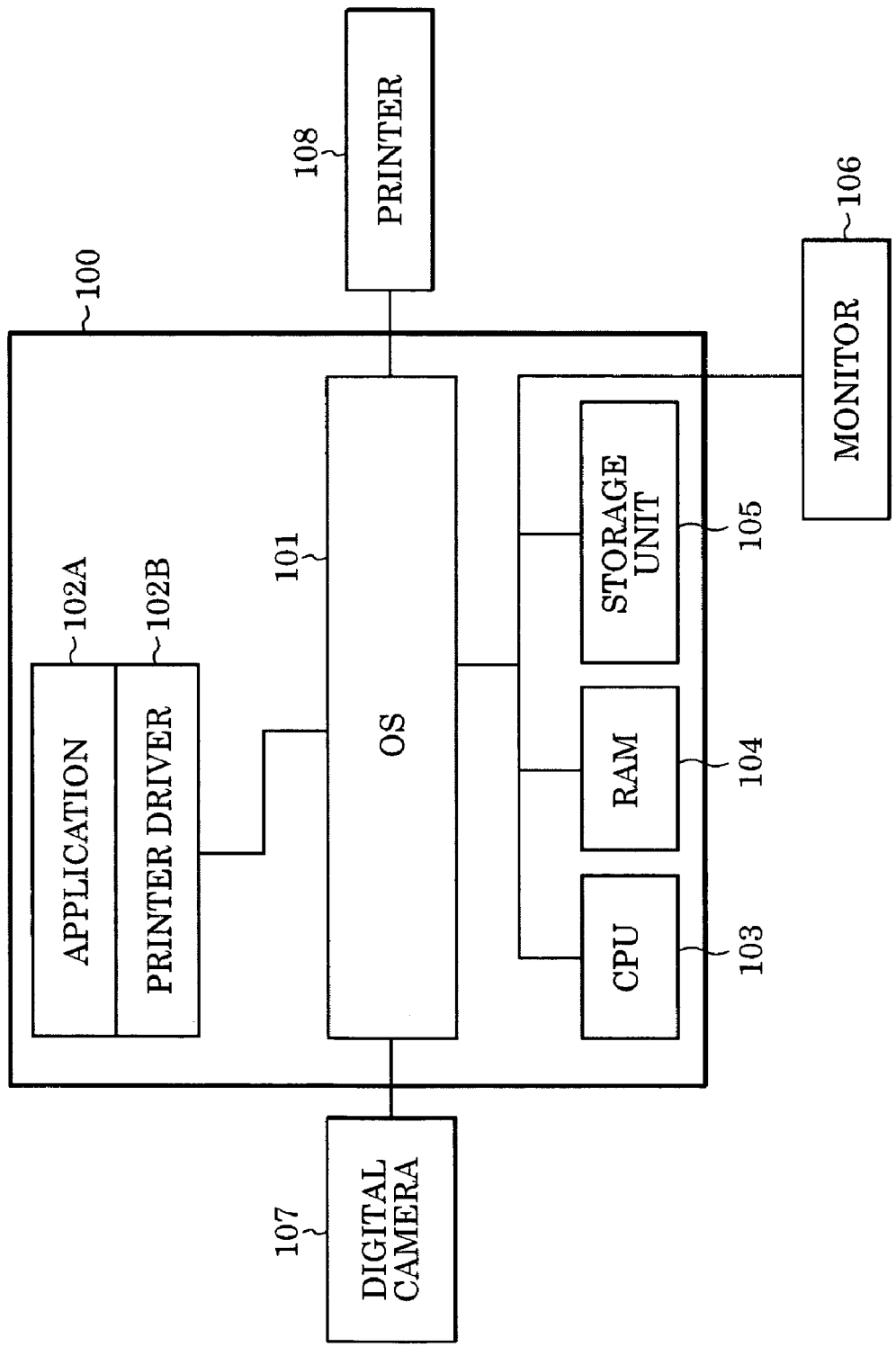
FIG. 1 is a block diagram of a printing system including a printing apparatus according to a first embodiment of the present invention.

FIG. 1 is a block diagram of a printing system including a printing apparatus according to a first embodiment of the present invention.

As shown in FIG. 1, this system includes a host computer 100, a digital camera 107, a printer 108, and a monitor 106. The printer 108 is connected to the host computer 100 so as to allow two-way communication therebetween. The printer 108 may be, for example, an inkjet type of printer.

The host computer 100 includes an operating system (OS) 101. The host computer 100 also includes an application 102A and a printer driver 102B, both of which carry out image processing under the control of the OS 101.

The host computer 100 also includes a central processing unit (CPU) 103, a random access memory (RAM) 104, and a storage unit 105 including a hard disk HD and a recording unit for reading a recording medium, such as a compact disk (CD), all of which are operable under the control of the above-described software. That is, the CPU 103 executes signal processing concerning a process according to the above-described software. The storage unit 105 stores the software in advance, which is read out and executed by the CPU 103 when needed. The RAM 104 is used as a work area of the CPU 103 when executing the signal processing.

Image data is stored in the digital camera 107 and is input to the host computer 100 when needed. The image data may be read out from the digital camera 107 in advance to be stored in the storage unit 105. In some cases, image data to be stored in the digital camera 107 is recorded and managed in the format of a predetermined recording medium (for example, a secure digital (SD) memory).

Additionally, the image data may be stored in another host computer including a server connected to the host computer 100.

The image data can be transferred from the digital camera 107 to the host computer 100 via a card reader, a cable connection, infrared data communication, or radio data communication. The host computer 100 may directly read the image data from a memory card or a built-in memory of the digital camera 107 via a card reader, a cable connection, infrared data communication, or wireless data communication without moving the image data to a recording medium in the host computer 100.

The digital camera 107 may be replaced with an image input device having the identical function, such as a film scanner.

One embodiment shown in FIG. 1 is a system in which a personal computer (PC) compatible with a widely used IBM AT-PC running Microsoft Windows® OS is employed, an application capable of carrying out a desired printing operation is installed in the PC, and the monitor 106, the printer 108, and the digital camera 107 are connected to the PC.

Figure 2:
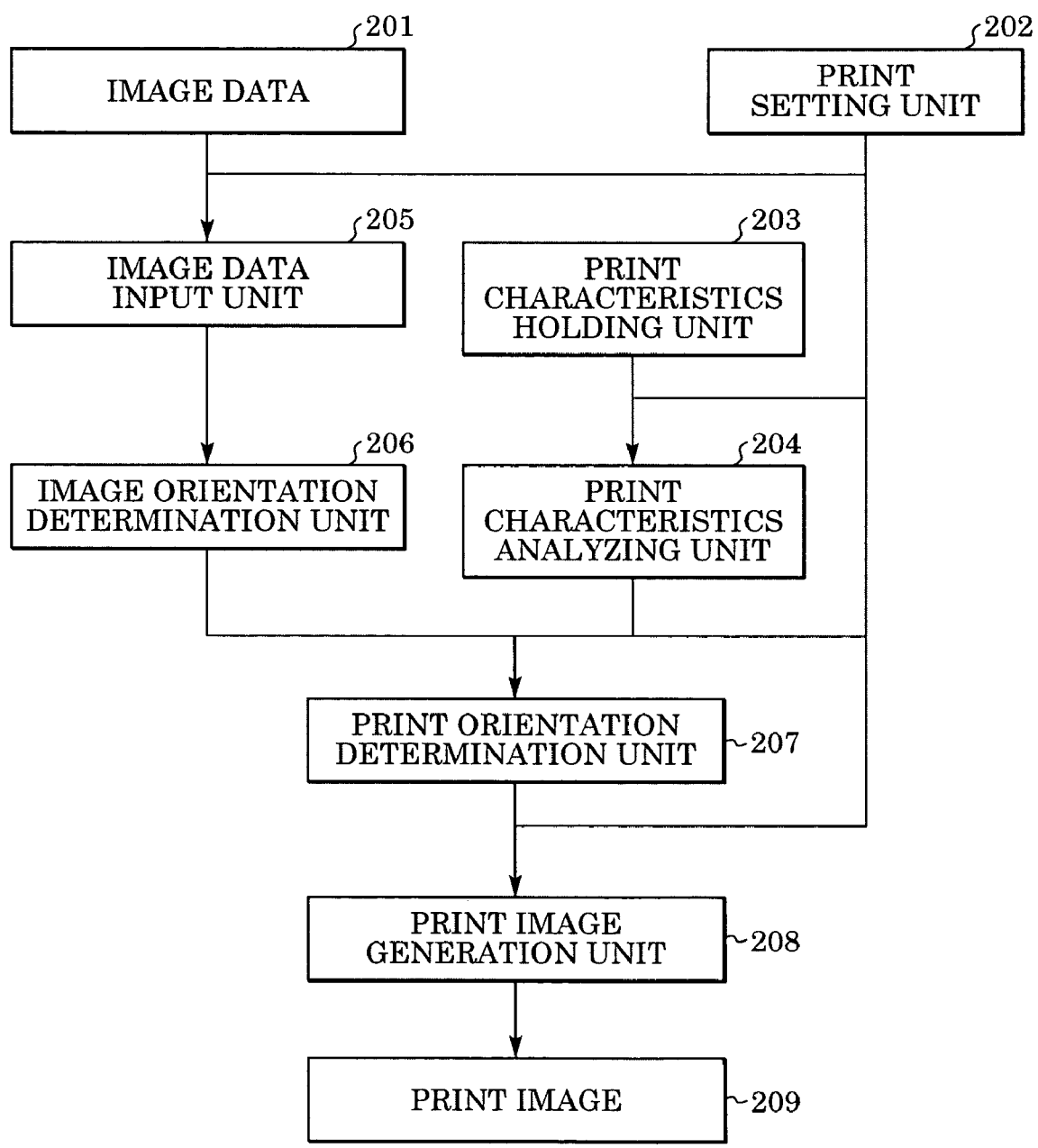
FIG. 2 is a block diagram illustrating a data processing function of the printing apparatus according to the first embodiment of the present invention.

FIG. 2 is a block diagram illustrating a data processing function of the printing apparatus according to the first embodiment of the present invention. The data processing function corresponds to a data processing mechanism of the printer 108 shown in FIG. 1.

As shown in FIG. 2, image data 201 to be printed have a predetermined data format, such as TIFF or JPEG, and is received from the digital camera 107 or the host computer 100 via an interface (I/F) (not shown). A print setting unit 202 selects the image data 201 to be printed and sets up the type, size, and orientation of print paper. The print setting unit 202 includes a device such as an operation panel (not shown).

A print characteristics holding unit 203 holds, as resource information, print characteristics information with respect to the paper feed direction in a nonvolatile memory (not shown). A print characteristics analyzing unit 204 matches the print characteristics information held by the print characteristics holding unit 203 against the current print setting, such as the print paper type and the print paper size, set by the print setting unit 202 to analyze the current print feed characteristics. The print characteristics analyzing unit 204 is sometimes composed of hardware, such as a CPU, a read-only memory (ROM), and a RAM (none are shown).

An image data input unit 205 reads out the image data 201 selected by the print setting unit 202 from a memory of the digital camera 107 or a recording medium, such as the storage unit 105 of the host computer 100.

An image orientation determination unit 206 analyzes the input image data 201 to determine the orientation of the image. The image orientation determination unit 206 may be composed of hardware, such as a CPU, a ROM, and a RAM (none are shown). A print orientation determination unit 207 determines the print orientation using the orientation of the print paper specified by the print setting unit 202, the current print characteristics analyzed by the print characteristics analyzing unit 204, and the image orientation determined by the image orientation determination unit 206.

A print image generation unit 208 generates a print image 209 based on the specified print setting and the acquired print orientation. The print image 209 is output to a printer engine unit of a serial type (not shown) and is printed on a delivered sheet of paper having a specified size.

The print characteristics holding unit 203 holds print characteristics associated with the paper feed direction of the printer. One of the print characteristics may be a difference between margins at a leading edge and a trailing edge of a sheet of paper when printing.

Another possible print characteristic is paper feed precision at a leading edge and a trailing edge of a sheet of paper when printing. A print area where the print quality is degraded due to the degradation of the paper feed precision is another possible print characteristic. In addition, the position of a perforation line of print paper is another possible print characteristic.

These print characteristics possibly vary depending on the type of print paper, the size of print paper, the print quality, and the print speed. In this case, the print characteristics are held in association with each of the type of print paper, the size of print paper, the print quality, and the print speed.

In a printing apparatus having such a configuration, the print characteristics analyzing unit 204 analyzes a paper feed characteristic associated with a sheet of paper to be fed based on set print conditions and the print characteristic information. The image orientation determination unit 206 further analyzes input image data and determines the orientation of the image. The print orientation determination unit 207 then determines the print orientation of the image data for the fed sheet of paper based on the result of the analysis and the determination. Subsequently, the print image generation unit 208 generates print image data to be output to the printing unit from the image data.

FIG. 3 shows an example of the print characteristic information attributable to the engine unit and stored in a storage unit of the host computer 100 shown in FIG. 1. In this embodiment, the print characteristic information is held in a storage unit, such as the hard disk HD and a CD in the host computer 100. The print characteristic information is stored, as part of resource information, in the storage unit 105 when a print driver is installed in the storage unit 105.

As shown in FIG. 3, the print characteristic information is recorded in a form of a table, which contains information, such as margins, paper feed precision at a borderless printing time, and a perforation line for each type of paper.

The print characteristics analyzing unit 204 determines a print characteristic associated with a paper feed corresponding to the print setting set by the print setting unit 202 from the print characteristic information held by the print characteristics holding unit 203.

Any method may be used for the image orientation determination unit 206 to determine the orientation of an image. Recently, image data files of many digital cameras contain not only image data, but also photographic conditions at a shooting time (e.g., exposure time, aperture, and flash on/off setting) as additional information.

In fact, many digital cameras produce image data based on the standard known as Exif (Exchangeable image file format for digital still cameras), which contains various types of information as additional information. Additionally, some digital cameras have a built-in sensor for detecting the direction thereof and add the directional information to the additional information.

The Exif standard includes image-orientation information as the Orientation tag or a maker's proprietary tag. For image data having this information, the orientation of an image can be determined by analyzing this additional information.

Also, the image includes a subject, which may be a human, a building, or a vehicle. The orientation of the image can be determined by extracting and analyzing the subject. In particular, if the subject is a human, the orientation of the face of the human can be determined by carrying out a face-extraction image process using a face-extraction algorithm and further detecting parts of the face, such as eyes, a nose, and a mouth.

In many scenes of shooting, since the orientation of a face is identical to that of an image, the orientation of a face may be considered as the orientation of an image. By determining the orientation of a face area, the orientation of the image can be determined. In the above description, the subject is a human. However, the subject may be any subject, such as a building and a vehicle, since the orientation of the image can be determined in the same manner by focusing feature points of the subject.

The determination process of print orientation by the print orientation determination unit 207 will be described in detail next.

The orientation (horizontal to vertical ratio) of a sheet of paper is first compared with the orientation (horizontal to vertical ratio) of image data to check if the top and bottom of the image data match the leading edge and trailing edge of the print orientation. If a landscape image is printed on a portrait sheet, the top and bottom of the image data do not match the leading edge and trailing edge of the print orientation. Accordingly, the impact of the difference between margins and the streaking due to the paper feed direction do not appear at top and bottom portions of the printout.

Also, if a portrait image is printed on a landscape sheet, the top and bottom of the image data do not match the leading edge and trailing edge of the print orientation. Accordingly, the impact of the difference between margins and the streaking due to the paper feed direction do not appear at top and bottom portions of the print data.

The present invention solves the problem when the top and bottom of the image data match the leading edge and trailing edge of the print orientation after comparing the orientation (horizontal to vertical ratio) of a sheet of paper with the orientation (horizontal to vertical ratio) of the image data. When detecting that the orientation (horizontal to vertical ratio) of a sheet of paper is the same as the orientation (horizontal to vertical ratio) of the image data, the print orientation determination unit 207 determines the print orientation as follows: (the determination method used by the print orientation determination unit 207 shown in FIG. 2 may be any one of the following first to third determination processes)

First Determination Process

In the case where the print characteristics acquired by the print characteristics analyzing unit 204 are related to the size of the margin, as shown in FIG. 3, the print orientation determination unit 207 determines the print orientation as follows.

If a margin size at the leading edge is greater than that at the trailing edge, the print orientation determination unit 207 determines the print orientation so that the bottom of the image data matches the leading edge of the print orientation. If a margin size at the trailing edge is greater than that at the leading edge, the print orientation determination unit 207 determines the print orientation so that the bottom of the image data matches the trailing edge of the print orientation.

If a margin size at the leading edge is equal to that at the trailing edge, print data may be created in the print orientation starting from either top or bottom of the image data.

Second Determination Process

In the case where the print characteristics acquired by the print characteristics analyzing unit 204 are related to the paper feed precision at the leading and trailing edges of a print sheet and a degraded print quality area due to the degradation of the paper feed precision, as shown in FIG. 3, the print orientation determination unit 207 determines the print orientation as follows.

If a degraded print quality area is at the leading edge of the print orientation, the print orientation is determined such that the bottom of the image data matches the leading edge of the print orientation. If the degraded print quality area is at the trailing edge of the print orientation, the print orientation is determined such that the bottom of the image data matches the trailing edge of the print orientation.

For example, a printer has a degraded print quality area at the trailing edge of a sheet of paper. When the printer prints image data in the original orientation of the image data, the top of the image is printed at the leading edge of the sheet. In this case, if the orientation of the image data is the same as the orientation of the print sheet, the print orientation of the image data is set to the original orientation of the image data without change. That is, it is determined that the image is directly printed without rotating it.

Additionally, a printer has a degraded print quality area at the trailing edge of a sheet of paper. When the printer prints image data in the original orientation of the image data, the top of the image is printed at the leading edge of the sheet. In this case, if the orientation of the image data is not the same as the orientation of the print sheet (the image is rotated 180° and is upside down), the print orientation of the image data is set to the orientation of the 180°-rotated image data. That is, it is determined that the image is rotated 180° and is printed.

Additionally, a printer has a degraded print quality area at the leading edge of a sheet of paper. When the printer prints image data in the original orientation of the image data, the top of the image is printed at the leading edge of the sheet. In this case, if the orientation of the image data is the same as the orientation of the print sheet, the print orientation of the image data is set to the orientation of the 180°-rotated image data. That is, it is determined that the image is rotated 180° and is printed.

Additionally, a printer has a degraded print quality area at the leading edge of a sheet of paper. When the printer prints image data in the original orientation of the image data, the top of the image is printed at the leading edge of the sheet. In this case, if the orientation of the image data is not the same as the orientation of the print sheet (the image is rotated 180° and is upside down), the print orientation of the image data is set to the original orientation of the image data. That is, it is determined that the image is directly printed without rotating it.

Third Determination Process

In the case where the print characteristics acquired by the print characteristics analyzing unit 204 are related to the position of a perforation line on print paper, the print orientation determination unit 207 determines the print orientation as follows.

If the position of a perforation line on print paper is located at the leading edge of the print orientation, the print orientation determination unit 207 determines the print orientation so that the bottom of the image data matches the leading edge of the print orientation. If the position of a perforation line on print paper is located at the trailing edge of the print orientation, the print orientation determination unit 207 determines the print orientation so that the bottom of the image data matches the trailing edge of the print orientation.

The print image generation unit 208 generates a print image from the image data 201 based on the print orientation determined by the print orientation determination unit 207. For example, if it is determined that the print orientation is unchanged, that is, in the case where a printer has a degraded print quality area at the trailing edge of a sheet of paper, the top of an image is printed at the leading edge of the sheet when printing image data without change, and the orientation of the image data is the same as the orientation of the print sheet, the image is rendered without change in a work memory, such as a RAM. However, if it is determined that the print orientation is rotated, that is, in the case where a printer has a degraded print quality area at the trailing edge of a sheet of paper, the top of an image is printed at the leading edge of the sheet when printing image data without change, and the orientation of the image data is not the same as the orientation of the print sheet (the image is rotated 180° and is upside down), the image is rendered in a work memory, such as a RAM, while the image is rotated 180°. Also, the print image generation unit 208 can carry out image processing specified by a user, such as automatic image correction, sharpness correction, and a date and time input, while generating a print image from the image data 201 based on the print orientation determined by the print orientation determination unit 207.

Figure 4:
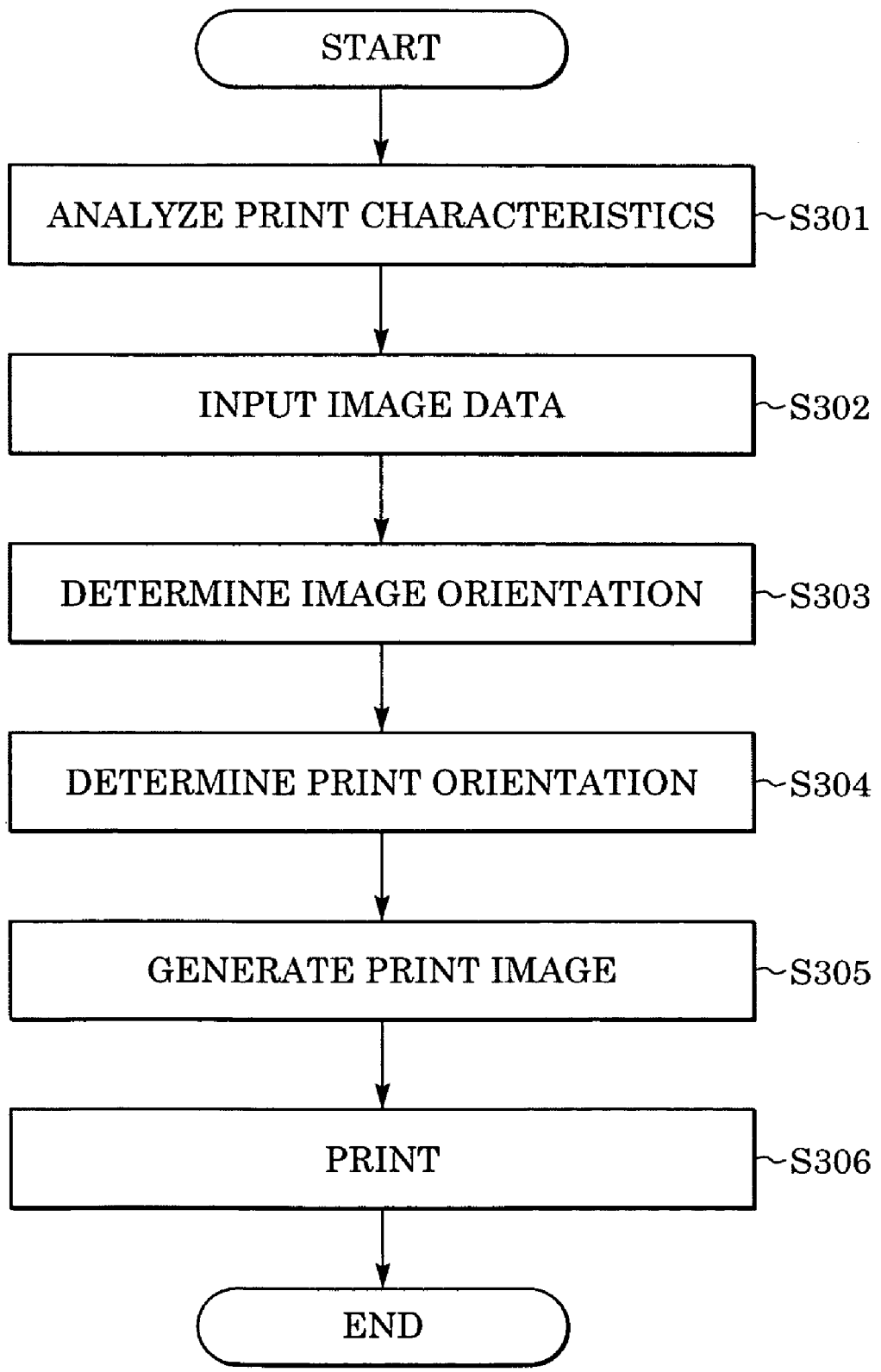
FIG. 4 is a flow chart illustrating an example of a first data processing procedure of the printing apparatus according to the present invention.

FIG. 4 is a flow chart illustrating an example of the first data processing procedure of the printing apparatus according to the present invention. This data processing procedure corresponds to the procedure of the printer 108 shown in FIG. 1, where the printer 108 analyzes image data and acquires a printout (the above-described print orientation determination process is included). In FIG. 4, steps S301 to S306 are shown.

First, at step S301, the print characteristics analyzing unit 204 matches the print characteristic information held by the print characteristics holding unit 203 with the current print conditions to analyze the current print characteristics with reference to the table shown in FIG. 3. The table is stored in the print characteristics holding unit 203 shown in FIG. 2. At step S302, the image data input unit 205 then inputs the image data 201 to be processed. At step S303, the image orientation determination unit 206 analyzes the input image data 201 to determine the orientation of the image using the above-described determination method.

At step S304, the print orientation determination unit 207 determines the print orientation using the current print characteristics analyzed by the print characteristics analyzing unit 204 and the orientation of the image determined by the image orientation determination unit 206.

Subsequently, at step S305, the print image generation unit 208 generates print image data in a work memory, such as a RAM (not shown), based on the acquired print orientation. Finally, at step S306, the print image generated on the work memory is output to the engine unit and the image data is printed on a sheet of the selected paper fed from the engine unit. The process is then completed.

The print characteristic analyzing process of step S301, the image data input process of step S302, and the image orientation determination process of step S303 in FIG. 4 may be changed in order to the sequence of steps S302, S303, and S301.

Thus, the print orientation for image data is determined based on the characteristic information of the printing apparatus, such as margins, the paper feed precision, and a position of a perforation line, and the orientation attributed to the received image data. Consequently, a printout in which a degraded print quality area is adjacent to the top of the image is avoided and the image data can be printed on the selected paper while preventing the degraded print quality area caused by the characteristics of the printing apparatus from overlapping the top of the image data.

Also, the visual effect of image quality degradation caused by print characteristics of paper feed orientation in a paper transport mechanism of a printing apparatus can be decreased in printouts.

Second Embodiment

In the above-described embodiment, the orientation of an image is determined by analyzing image data. However, the print orientation may be determined by extracting a subject in image data so as to more precisely analyze the orientation of the image and by determining whether the subject area overlaps the degraded print quality area. This embodiment will be described next.

Figure 5:
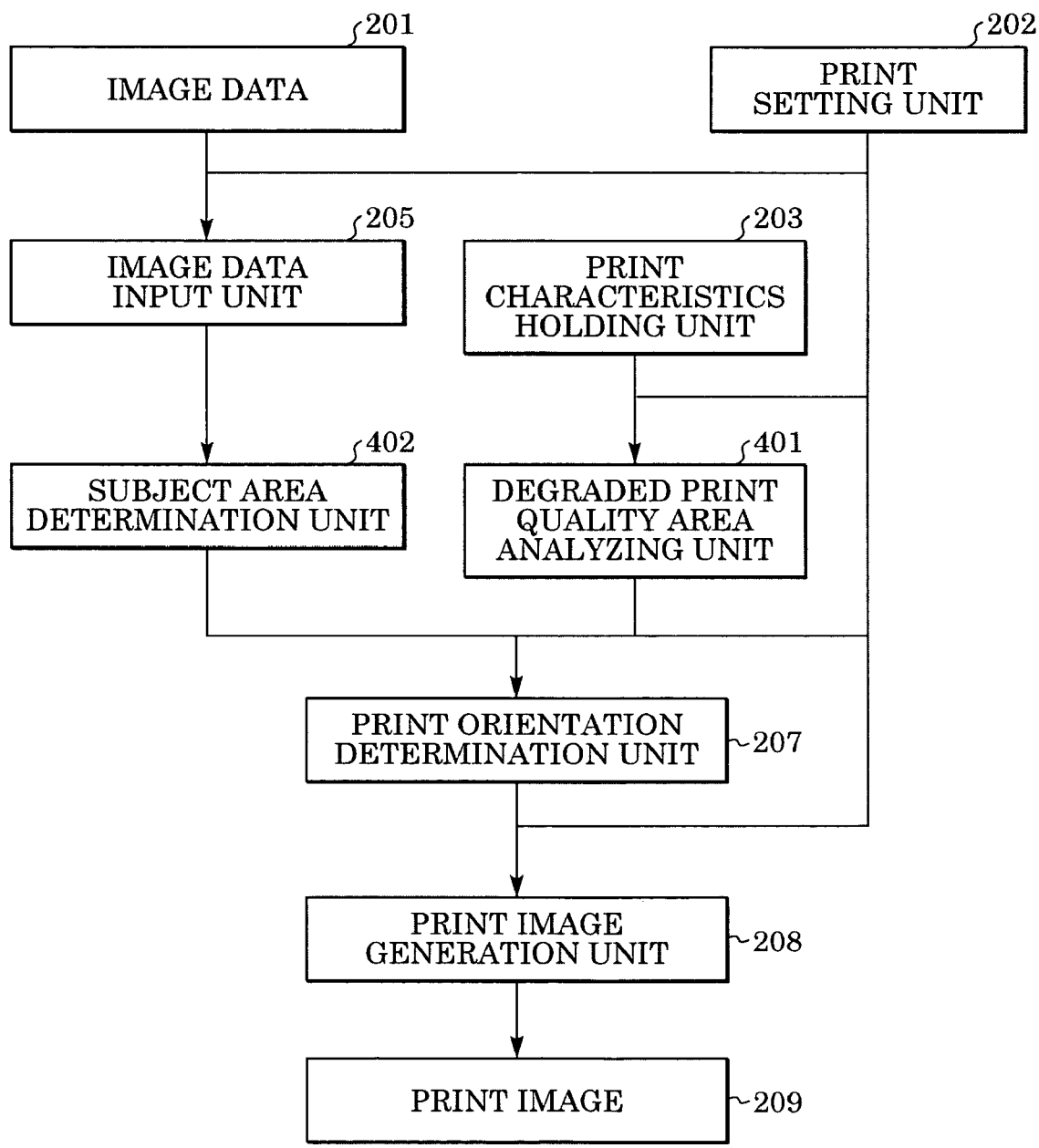
FIG. 5 is a block diagram of a printing apparatus according to a second embodiment of the present invention.

FIG. 5 is a block diagram of a printing apparatus according to the second embodiment of the present invention. The identical elements to those illustrated and described in relation to FIG. 2 are designated by identical reference numerals.

In FIG. 5, the image data 201, the print setting unit 202, the print characteristics holding unit 203, the image data input unit 205, the print orientation determination unit 207, the print image generation unit 208, and the print image 209 are identical to those described in the first embodiment. In addition to these elements, the printing apparatus includes a degraded print quality area analyzing unit 401 and a subject area determination unit 402. The degraded print quality area analyzing unit 401 matches print characteristic information held by the print characteristics holding unit 203 in a form of a table shown in FIG. 6 with the current print setting, such as a print paper type and size, specified by the print setting unit 202 to analyze the degraded print quality area of the current paper feed. The subject area determination unit 402 analyzes the input image data 201 to determine the subject area in the image. The table shown in FIG. 6 is described below.

The print characteristics holding unit 203 holds print characteristic information associated with the paper feed direction of a printer, for example, in a form of the table shown in FIG. 6.

The above-described units 401, 402, 207, and 208 may be modules stored in a memory of the printer. The present invention can be applied to the function of these modules by a CPU (not shown) executing these modules. Accordingly, although steps of a flow chart described below are described as processes of these units, these units may be replaced with a control program executed by the CPU.

In a printing apparatus having such a configuration, the degraded print quality area analyzing unit 401 analyzes a degraded print quality area possibly occurred on paper based on the print conditions set by the print setting unit 202 and the information about the paper feed precision among the print characteristic information held by the print characteristics holding unit 203. The subject area determination unit 402 further analyzes input image data to determine and extract the subject area. The subject area determination unit 402 then determines overlap between the subject area and the degraded print quality area based on the result of the analysis and the area determination result. Subsequently, the print orientation determination unit 207 determines the print orientation of the subject (i.e., it is determined in which direction the subject to be printed is arranged with respect to the print sheet). Based on the determined print orientation, the print image generation unit 208 generates print image data to be output to the printing unit functioning as an engine unit from the image data. Accordingly, when printing input image data under the set print conditions, the subject in the image data can be printed in an area where the degradation of print quality for the printed image data is not noticeable even if the degraded print quality area caused by the characteristics of the fed paper overlaps a print area of the subject in the image data. As a result, the visual effect of image quality degradation caused by print characteristics about paper feed of the printing apparatus can be decreased.

FIG. 6 shows an example of a print characteristic information table illustrating a relationship between a paper type and a degraded print quality area, which are stored in the print characteristics holding unit 203 shown in FIG. 5.

As shown in FIG. 6, this table contains a degraded print quality area caused by the degradation of paper feed precision at the leading and trailing edges of a print sheet. The print characteristic may vary depending on a print paper type, a print paper size, desired print quality, and a print speed.

In this case, the print characteristics are held for each of the print paper type, print paper size, desired print quality, and print speed. FIG. 6 shows an example of this case.

Any method may be used for the subject area determination unit 402 to determine a subject in an image. As described in the first embodiment, many image data files of digital cameras recently contain not only image data, but also photographic conditions at a shooting time (e.g., exposure time, aperture, and flash on/off) as additional information.

The Exif standard includes a tag describing a subject area as the SubjectArea tag. For image data having this information, a subject area in an image can be determined by analyzing this additional information.

On the other hand, the image includes a subject, which may be a human, a building, or a vehicle. The subject area can be determined by extracting and analyzing the subject. In particular, if the subject is a human, the subject area can be determined by extracting a face using a face-extraction algorithm. However, even if the subject is a building or a vehicle, the subject can be extracted and the subject area can be determined by focusing the feature points of the subject. That is, the subject may be any subject.

Additionally, a subject can be extracted by using additional image information describing the position of the subject, for example, the SubjectLocation tag of the Exif standard. In many cases, a subject is particularly focused on. For a digital camera having multiple focusing points, a subject can be extracted by using this focusing point information attached to an image. The determination process of print orientation by the print orientation determination unit 207 will be described in detail next.

The print orientation determination unit 207 shown in FIG. 5 compares the position of a subject area with the position of a degraded print quality area for both cases when generating print data in the normal print orientation and when generating print data in the reverse print orientation. If the print orientation determination unit 207 determines that, when the print data is generated in the normal print orientation, the degraded print quality area does not contain the position of the subject area, then the print orientation determination unit 207 determines that the normal print orientation is the print orientation. That is, the print orientation determination unit 207 determines that the print data is directly printed without rotating it.

On the other hand, if the print orientation determination unit 207 shown in FIG. 5 determines that, when the print data is generated in the normal print orientation, the degraded print quality area contains the position of the subject area and if the print orientation determination unit 207 determines that, when the print data is generated in the reverse print orientation, the degraded print quality area does not contain the position of the subject area, then the print orientation determination unit 207 determines that the reverse print orientation is the print orientation. That is, the print orientation determination unit 207 determines that the print data is rotated 180° and is printed.

Furthermore, when a subject area is large or multiple subject areas exist, the degraded print quality area possibly contains the position of the subject area for both cases where print data is generated in the normal print orientation and in the reverse print orientation.

If this happens, the print orientation determination unit 207 shown in FIG. 5 compares the sizes of the subject area contained in the degraded print quality area for both cases with each other and determines the print orientation so that the size of the subject area contained in the degraded print quality area is smaller.

Figure 7:
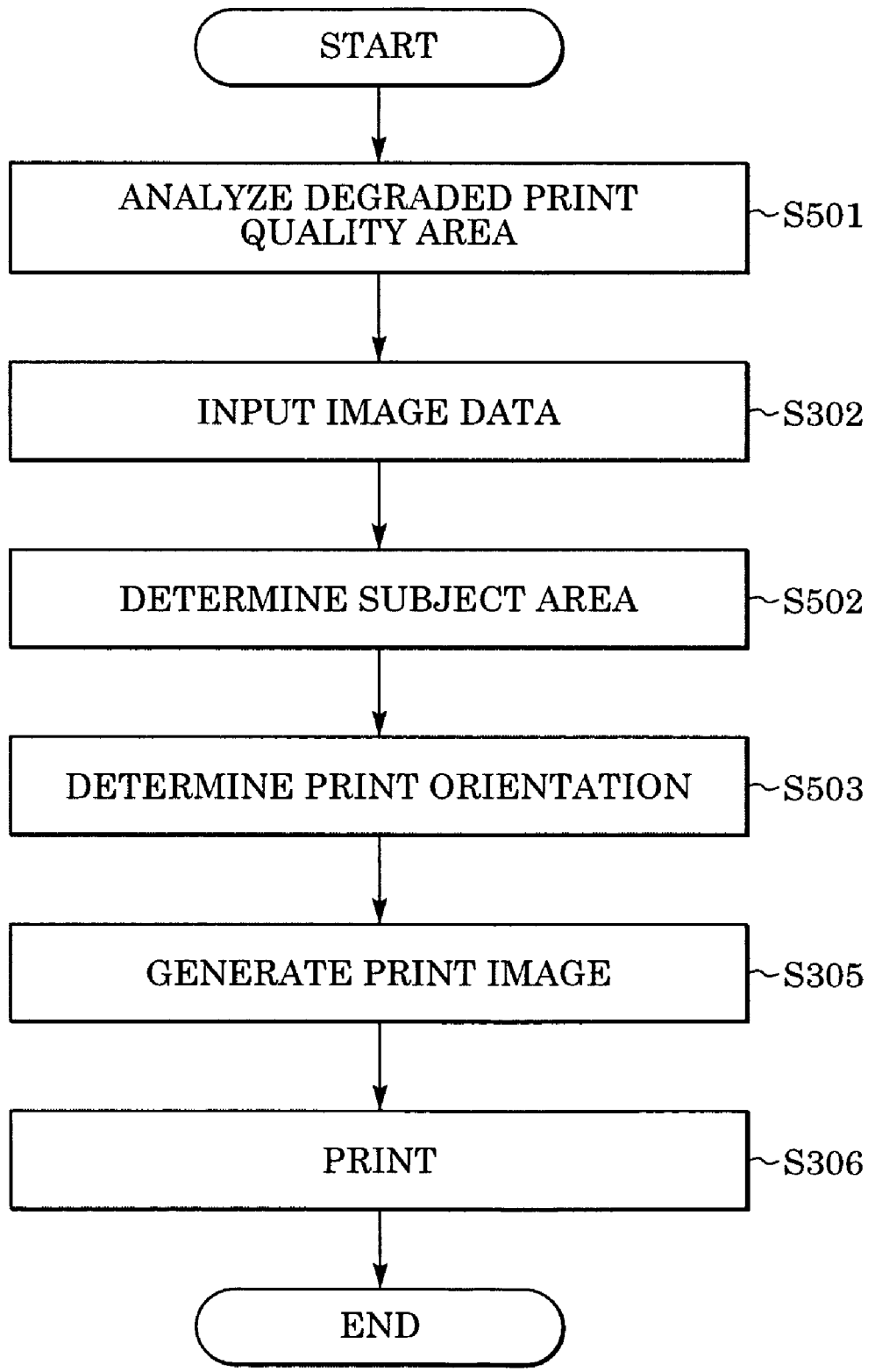
FIG. 7 is a flow chart illustrating an example of a second data processing procedure of the printing apparatus according to the present invention.
Figure 9:
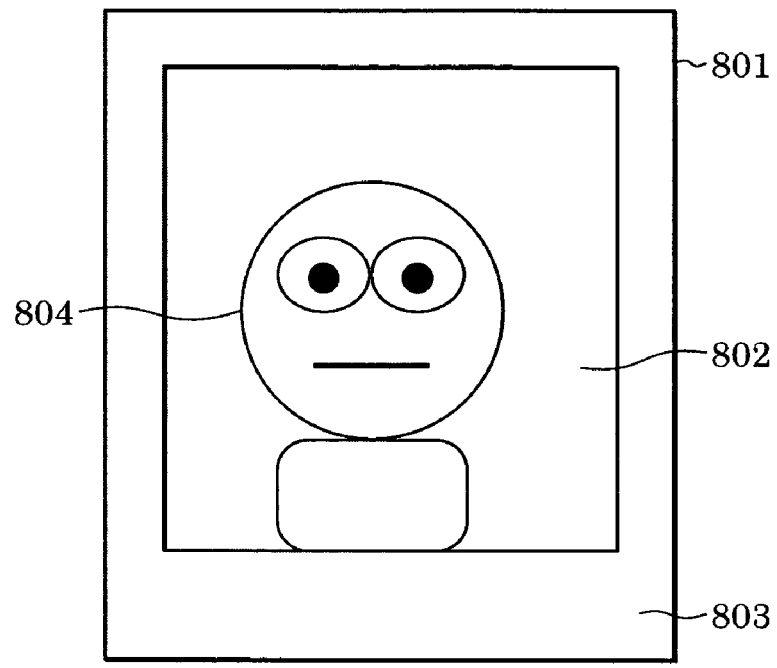
FIG. 9 is a diagram illustrating a printout image printed by a printing apparatus of this type.
Figure 10:
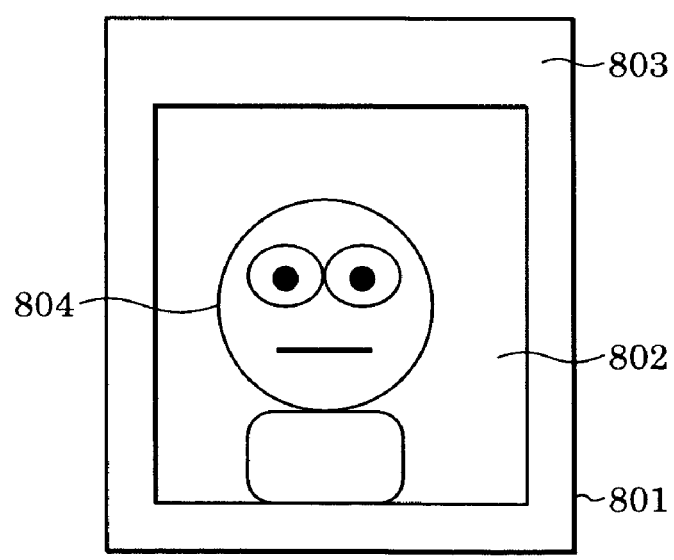
FIG. 10 is a diagram illustrating a printout image printed by a printing apparatus of this type.
Figure 11:
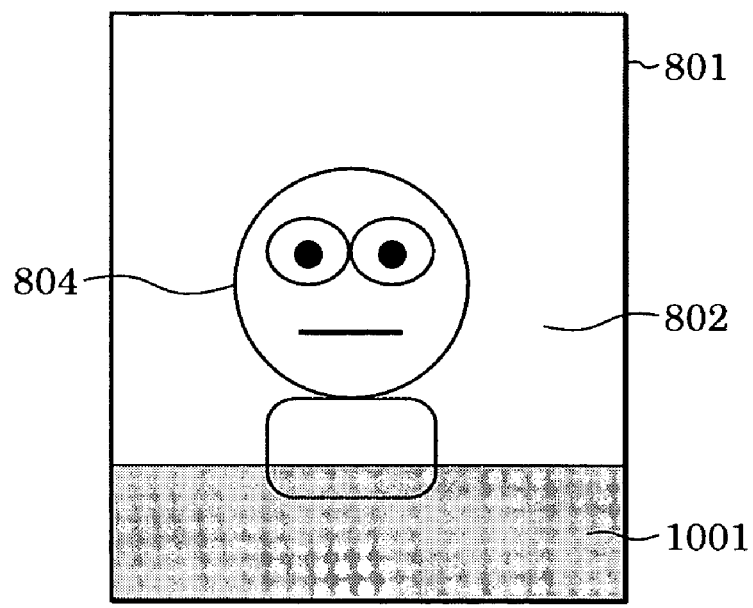
FIG. 11 is a diagram illustrating another printout image printed by a printing apparatus of this type.
Figure 12:
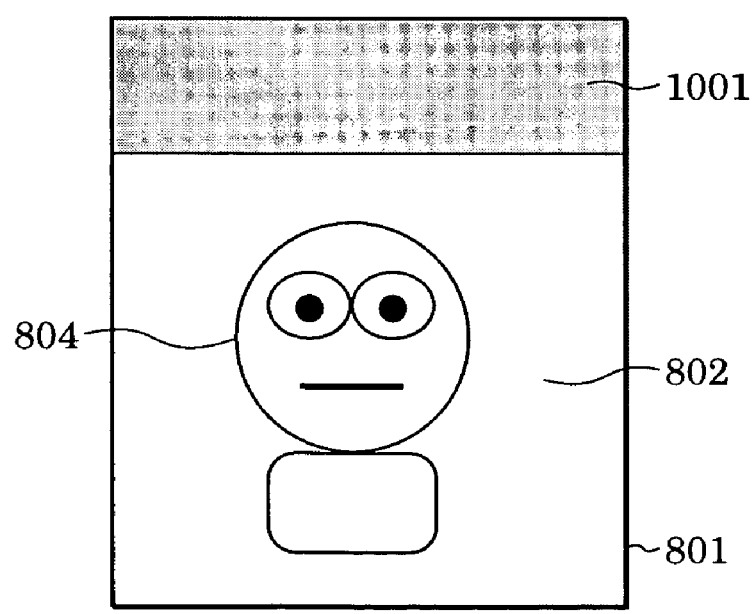
FIG. 12 is a diagram illustrating another printout image printed by a printing apparatus of this type.
Figure 13:
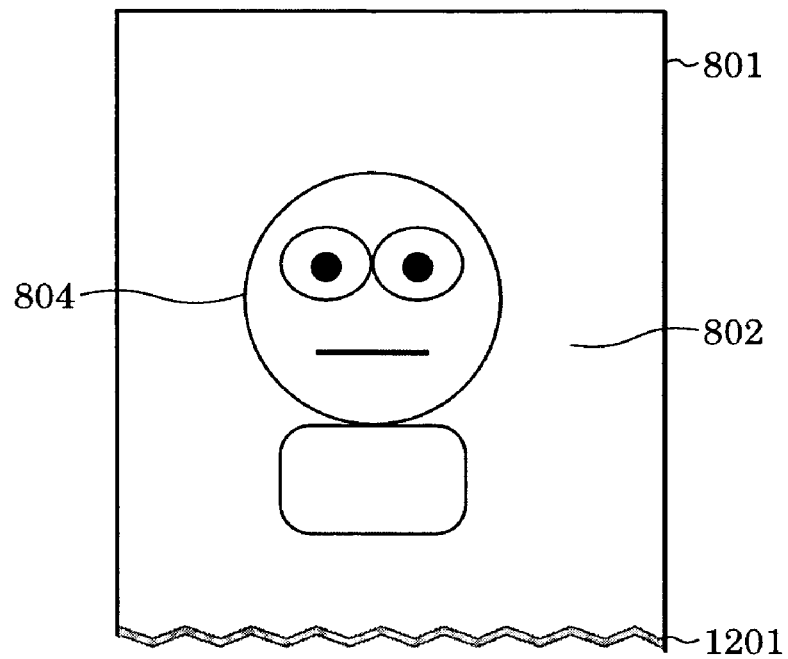
FIG. 13 is a diagram illustrating another printout image printed by a printing apparatus of this type.
Figure 14:
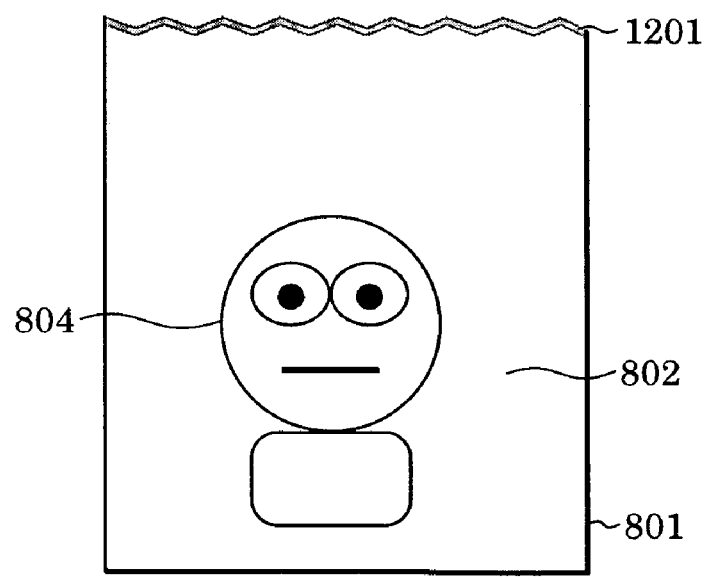
FIG. 14 is a diagram illustrating another printout image printed by a printing apparatus of this type.

FIG. 7 is a flow chart illustrating an example of the second data processing procedure of the printing apparatus according to the present invention. This data processing procedure corresponds to the procedure of the printer 108 shown in FIG. 1, where the printer 108 analyzes an image data and acquires a printout (the above-described print orientation determination process is included). In FIG. 7, steps S501, S502, S302, S304, S305, and S306 are shown. The identical steps to those illustrated and described in relation to FIG. 4 are designated by identical step numbers. Furthermore, each step may be achieved by a CPU of the printer 108 reading a control program corresponding to this process from a ROM or an external memory into a RAM and executing the control program.

First, at step S501, the degraded print quality area analyzing unit 401 compares print characteristic information held by the print characteristics holding unit 203 with the current print conditions set in image data to be printed input from a host computer and analyzes a degraded print quality area with respect to the current paper feed condition in the above-described manner.

Thereafter, at step S502, the input image data 201 is analyzed so as to determine a subject area in an image. At step S503, the print orientation is determined so that the degraded print quality area does not contain the subject area in the image. For example, if, in a printer, the subject area in the image is located in the leading edge area of a sheet of paper and the degraded print quality area is located in the trailing edge area of the sheet of paper, the print orientation of the image is determined so that the image is printed without change. If, in a printer, the subject area in the image is located in the trailing edge area of a print sheet and the degraded print quality area is located in the trailing edge area of the print sheet, the print orientation of the image is determined so that the printing is carried out in the 180°-rotated orientation of the image. More specifically, the print orientation is determined in the above-described manner of the print orientation determination unit 207 shown in FIG. 5.

The degraded print image area analyzing process of step S501, the image data input process of step S302, and the subject area determination process of step S502 in FIG. 7 may be changed in order to the sequence of steps S302, S502, and S501.

Thus, the user's complaint about print quality degradation in printouts, which possibly occurs due to the relationship between a degraded print quality area caused by the paper feed precision in a paper transport mechanism of a printing apparatus and a subject area in an image, can be decreased.

Third Embodiment

Figure 15:
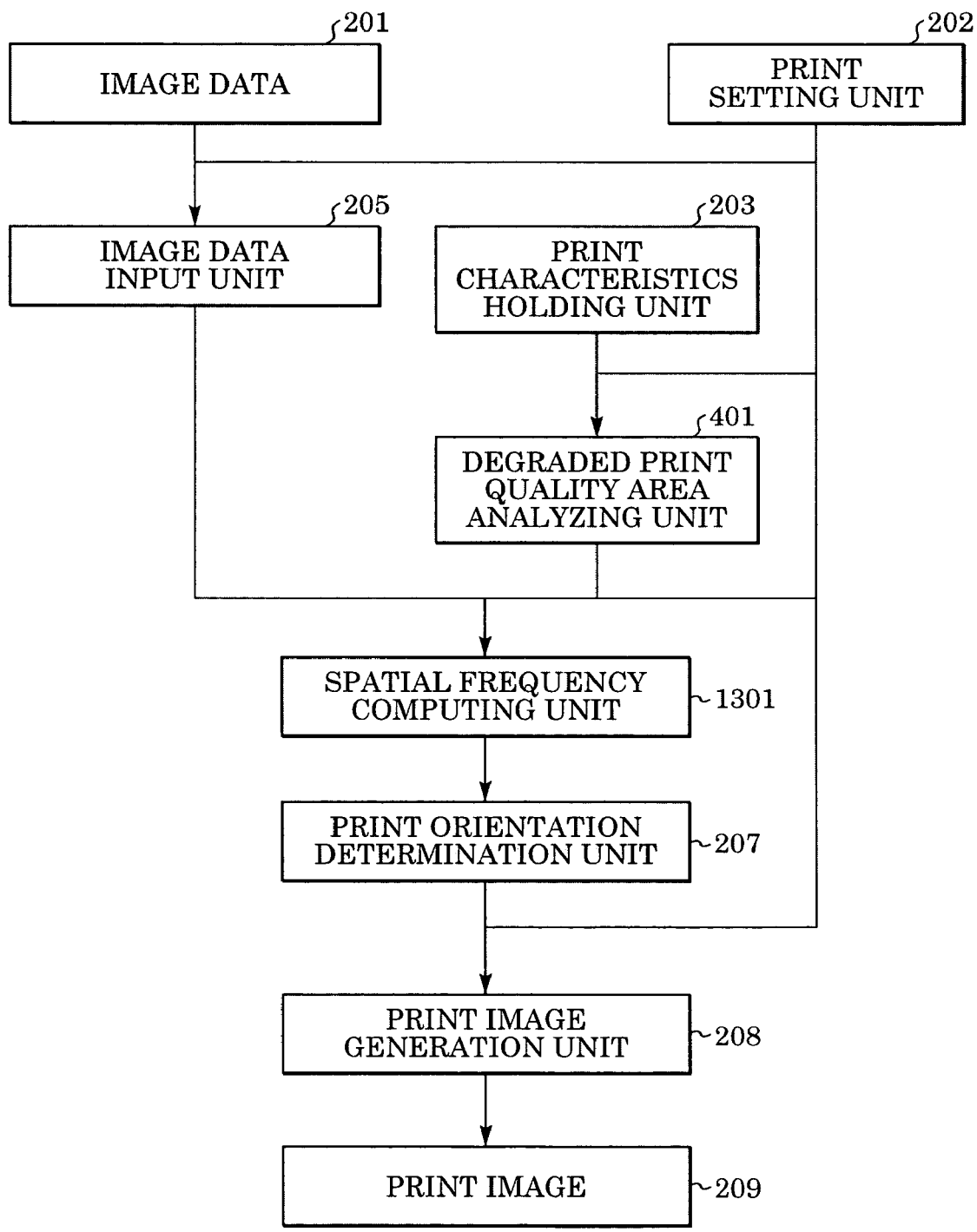
FIG. 15 is a functional block diagram of a printing apparatus according to a third embodiment of the present invention.

FIG. 15 is a functional block diagram of a printing apparatus according to a third embodiment of the present invention. In FIG. 15, the image data 201, the print setting unit 202, the print characteristics holding unit 203, the image data input unit 205, the print orientation determination unit 207, the print image generation unit 208, the print image 209, and the degraded print quality area analyzing unit 401 are identical to those described in the first and second embodiment. In addition to these elements, the printing apparatus includes a spatial frequency computing unit 1301 for computing a spatial frequency of the input image data 201 in a degraded print quality area analyzed by the degraded print quality area analyzing unit 401. The print characteristics holding unit 203 holds print characteristics associated with the paper feed orientation of the printer. The print characteristics include the paper feed precision at a leading edge and a trailing edge of a print sheet when printing and a degraded print quality area caused by the degradation of the paper feed precision. The print characteristic may vary depending on a print paper type, a print paper size, desired print quality, and a print speed. In this case, the print characteristic is held for each of a print paper type, a print paper size, desired print quality, and a print speed. FIG. 6 shows an example of the print characteristic information.

Figure 17:
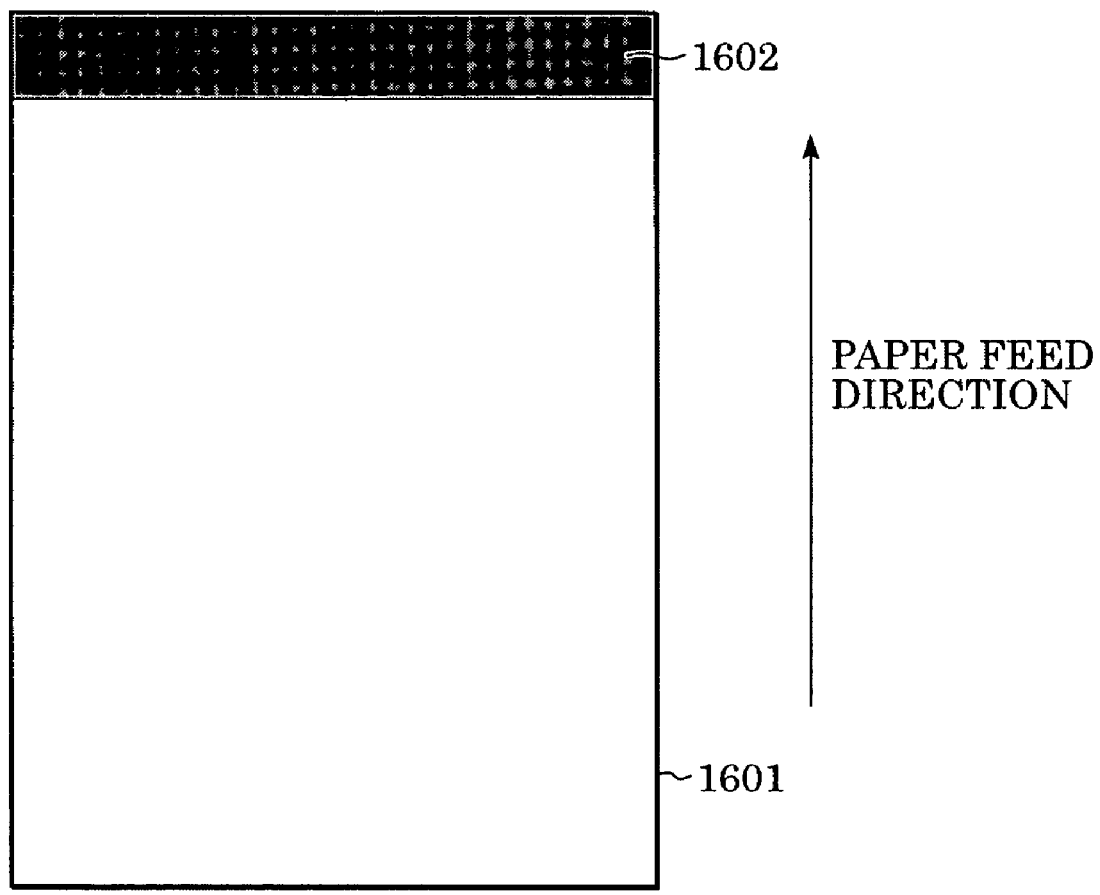
FIG. 17 shows an example of a sheet of print paper, a print orientation, and a degraded print quality area.

The spatial frequency computing unit 1301 computes two patterns of spatial frequency for the area analyzed by the degraded print quality area analyzing unit 401; one is a pattern for image data in the positive direction, and the other is a pattern in the reverse direction after the image data is rotated 180°. For example, FIG. 17 shows the case where a print characteristic at a leading edge is worse than that at a trailing edge. The spatial frequency computing unit 1301 assumes this format when printing an image on a print sheet 1601 and computes the spatial frequency at a partial image corresponding to a degraded print quality area 1602 shown in FIG. 17. The information of the degraded print quality area 1602 is held by the print characteristics holding unit 203. Also, the spatial frequency computing unit 1301 rotates the image 180° and then computes spatial frequency in the same manner. In this case, the same result can be obtained if the image is stationary and the print sheet 1601 and the degraded print quality area 1602, which are print characteristics, are rotated 180°. Various methods can be used for computing the spatial frequency. For example, Japanese Patent Laid-Open No. 2002-368994 discloses one of the methods in detail.

The print orientation determination unit 207 compares the spatial frequencies in the two patterns with each other and determines the print orientation such that a higher spatial frequency side corresponds to a worse print characteristic side held by the print characteristics holding unit 203. For example, FIG. 17 shows the case where the leading edge area of the print sheet is worse than the trailing edge area of the print sheet in print characteristics. In this case, since a leading edge of the print sheet is a degraded print quality area, the print orientation is determined so that a higher spatial frequency side of the image is located at the leading edge of the print sheet.

In general, a spatial frequency can be described as follows: For example, a partial image where black and green frequently appear one after another, like trees and lawn grass, and a partial image where a small dark blue part, light blue part, white part, and cyan part alternatively appear, like waves of the ocean, have a high spatial frequency. In contrast, a clear sky blue, a sunset color, and gradation, in which a color gradually changes, have a low spatial frequency.

If factors that cause poor print quality, such as noise, streaking, and a non-uniform color, overlap the area where the spatial frequency is low, the factors visually become more noticeable, thus degrading the quality of printouts. In this embodiment, as described above, a print side where factors that cause poor print quality, such as streaking and a non-uniform color, is moved to a high spatial frequency side to make the print quality degradation unnoticeable. Thereafter, the print image generation unit 208, if needed, rotates the image 180° and generates a print image so that the image is printed in the above-described orientation.

The operation of a printing apparatus according to the embodiment will be described next with reference to a flow chart of FIG. 16.

Figure 16:
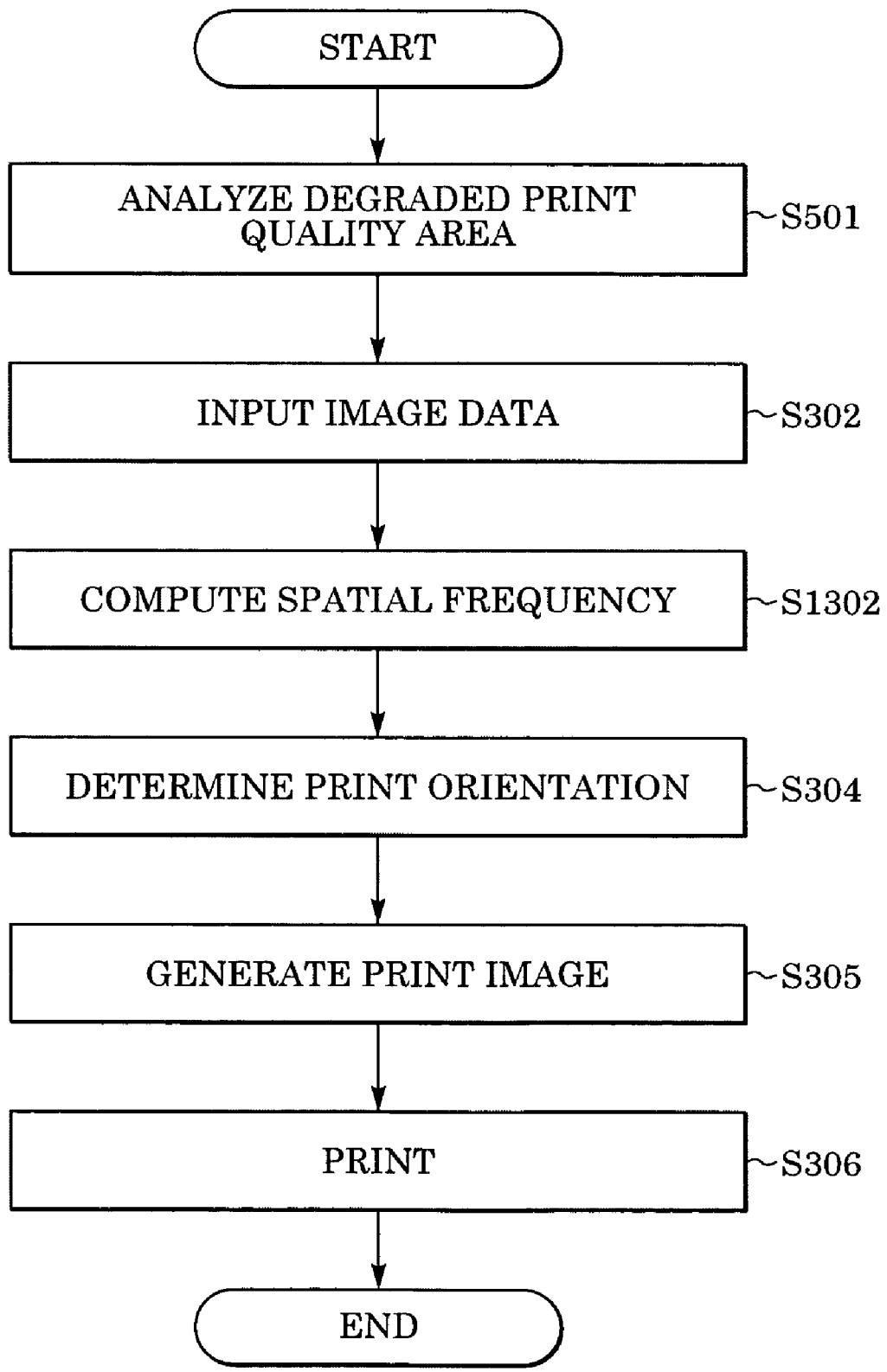
FIG. 16 is a flow chart illustrating an operation of the printing apparatus according to the third embodiment of the present invention.

In FIG. 16, the operations at steps S302, S305, S306, and S501 are identical to those described in the first and second embodiments. At step S1302, the spatial frequency of the input image data 201 is computed for the positive orientation and the reverse orientation of the degraded print quality area analyzed at step S501. At step S304, it is determined that the degraded print quality side is the high spatial frequency side.

Fourth Embodiment

In the first, second, and third embodiments, the host computer 100 carries out the series of processes. However, the digital camera 107 or the printer 108 may have the same function as the host computer 100 to carry out the series of processes thereon.

For example, if the printer 108 has the same function as the host computer 100, the image data 201 may be input from input means installed in the printer 108, such as a card reader, via a memory card. Alternatively, the digital camera 107 is connected to the printer 108 via a cable, infrared data communication, or radio data communication, and the image data 201 may be input from a memory card or a built-in memory in the digital camera 107.

Fifth Embodiment

In addition, data processing carried out by the printing apparatus may be implemented in a printer driver program of the host computer.

Sixth Embodiment

A data processing program readable by a printing system according to the present invention will be described below with reference to a memory map in FIG. 8.

FIG. 8 is a diagram illustrating a memory map of a recording medium for storing various types of data processing programs readable by the printing system according to the present invention.

Although not shown, management information for managing the programs stored in the recording medium, such as version information and an author, is also stored. In addition, information depending on an OS which reads out the programs, for example, an icon for identifying the program, may be stored.

Data for each program is also managed in a directory of the memory map. A program for installing each program in a computer may be stored. Furthermore, if the program to be installed is archived, a program for unarchiving the program may be stored.

According to the embodiment, the function described in relation to FIGS. 4 and 7 may be achieved by the host computer 100 executing a program externally installed. The present invention can be applied to this case, where information including the programs is supplied from an external recording medium to an output unit via a recoding medium, such as a CD-ROM, a flash memory, and a flexible disk (FD), or via a network.

As described above, it is apparent that the present invention is also achieved by supplying program code of software that realizes the functions of the above-described embodiments to a system or an apparatus and causing a computer (CPU or MPU (micro-processing unit)) of the system or the apparatus to read and execute the program code stored in the recording medium.

In such a case, the program code of the software achieves the specific functions of the present invention by itself. That is, a recording medium storing the program code achieves the present invention.

Thus, any form of the program, such as object code, a program executed by an interpreter, and script data supplied to the OS, is allowed as long as the program has the function.

The recording medium for supplying the program includes, for example, an FD, a hard disk, an optical disk, a magneto optical disk (MO), a CD-ROM, a CD-R (CD-recordable), a CD-RW (CD-rewritable), a magnetic tape, a nonvolatile memory card, a ROM, and a DVD (digital versatile disk).

In addition, the program may be supplied by accessing a home page on the Internet using a browser in a client computer and downloading the computer program of the present invention or an archive file including an auto-install function from the home page to a recording medium, such as a hard disk. Furthermore, program code of the program of the present invention may be divided into a plurality of files, which may be downloaded from different home pages. In other words, a WWW (world wide web) server and an FTP (file transfer protocol) server that allows a plurality of users to download a program file that achieves the functions of the present invention is also included in the present invention.

Additionally, the program according to the present invention can be encrypted and stored into a recoding medium, such as a CD-ROM, to deliver it to users. A user who satisfies a predetermined criterion can download key information for decrypting the encryption from a home page on the Internet. By using the key information, the user can install the encrypted program in a computer and can execute the program to achieve the present invention.

Additionally, in addition to achieving the functions of the above-described embodiments by the computer executing the readout program, the functions of the above-described embodiments can be achieved by a process that an OS running on the computer executes some of or all of the effective functions in response to instructions of the program.

Furthermore, the functions of the above-described embodiments can be achieved by a process in which, after a program read from a recording medium is stored in a memory of an add-on expansion board inserted in a computer or a memory of an add-on expansion unit connected to a computer, a CPU in the add-on expansion board or in the add-on expansion unit executes some of or all functions described in the above-described embodiments.

While the present invention has been described with reference to exemplary embodiments, it will be recognized by those skilled in the art that the scope and spirit of the invention is not limited to the particular embodiments described herein.

Although the above-described embodiments have been presented using the print characteristics holding unit 203 that is pre-stored in the printing apparatus and managed by the printing apparatus, the print characteristics holding unit 203 may be stored in the host computer as a profile of a driver, may add particular print characteristic information to image data based on the paper type selected by the driver, and may analyze the image data to reduce the load of the printing apparatus for analyzing the print characteristics.

Furthermore, the print driver of the host computer may include the means (units) 201 to 208 shown in FIG. 2, may acquire the print paper type from the printer or recognize the selected paper type not to generate printouts that show distinct print quality degradation even for a host-based printer.

According to the present invention, when printing input image data under the set print conditions, the image data can be printed in an area where the degradation of print quality for the printed image data is not noticeable based on the margins at a leading edge and a trailing edge of print paper and the orientation of the image data. As a result, the degradation of print quality caused by print characteristics of paper feed of a printer can be decreased.

According to the present invention, when printing input image data under the set print conditions, the image data can be printed in an area where the degradation of print quality for the printed image data is not prominent even if the degraded print quality area caused by the characteristics of the fed paper overlaps the print area of a subject in the image data. As a result, the degradation of print quality caused by print characteristics of paper feed of a printer can be advantageously decreased.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-121230 filed Apr. 16, 2004, and Japanese Patent Application No. 2005-032423 filed Feb. 9, 2005, which are hereby incorporated by reference herein.

What is claimed is:

1. A printing apparatus comprising:
   a print characteristics analyzing unit for determining print characteristics information of a printer based on a selected print setting for a print sheet type, the print characteristics information including a location on a print sheet of a degraded print quality area that occurs with the selected print setting for the print sheet type, wherein the print characteristics analyzing unit determines whether the location of the degraded print quality area occurs towards either a leading edge or a trailing edge of the print sheet, by referring to print characteristics information stored in association with the print sheet type;

an image orientation determination unit for determining an orientation of an image including a location of a top and a bottom of the image;

a print orientation determination unit for determining a print orientation of the image on the print sheet, based on the location of the degraded print quality area for the type of print sheet determined by the print characteristics analyzing unit, and the orientation of the image determined by the image orientation unit, by orienting the bottom of the image with the leading or trailing edge of the print sheet such that the bottom of the image is located at the degraded print quality area of the print sheet; and a printing unit for printing the image based on the print orientation determined by the print orientation determination unit.

2. The printing apparatus according to claim 1, wherein the print orientation determination unit determines the print orientation of the image to be an original orientation of the image when printing the image using a printer that has a degraded print quality area at the trailing edge of a print sheet of paper and prints the top of the image on the leading edge of the print sheet in a normal print mode, and the print orientation determination unit determines that the print orientation of the image is rotated when printing the image using a printer that has a degraded print quality area at the trailing edge of the print sheet of paper and prints the top of the image on the trailing edge of the print sheet in the normal print mode.

3. The printing apparatus according to claim 1, wherein the image orientation determination unit determines an original orientation of the image; and wherein the print orientation determination unit determines the print orientation of the image based on the original orientation of the image determined by the image orientation determination unit.

4. The printing apparatus according to claim 3, wherein the image orientation determination unit determines the original orientation of the image based on attribute information of the image.

5. The printing apparatus according to claim 3, wherein the image orientation determination unit determines the original orientation of the image based on a result of face detection or subject recognition.

6. A printing apparatus comprising:

a print characteristics analyzing unit for determining print characteristics information of a printer based on a selected print setting for a print sheet type, the print characteristics information including a location on a print sheet of a degraded print quality area that occurs with the selected print setting for the print sheet type, wherein the print characteristics analyzing unit determines where the location of the degraded print quality area occurs by referring to print characteristics information stored in association with the print sheet type;

a subject area determination unit for analyzing image data to determine a subject area of an image;

a print orientation determination unit for determining a print orientation of the image on the print sheet, based on the subject area of the image determined by the subject area determination unit and the location of the degraded print quality area for the type of print sheet determined by the print characteristics analyzing unit, so that a rate that the subject area of the image is included in the degraded print quality area is minimized; and a printing unit for printing the image based on the print orientation determined by the print orientation determination unit.

7. The printing apparatus according to claim 6, wherein the print orientation determination unit determines that the print orientation of the image is an original orientation of the image when the subject area of the image is at the top of the image using a printer that has a degraded print quality area at the trailing edge of a print sheet of paper and prints the top of the image on the leading edge of the print sheet in a normal print mode, and the print orientation determination unit determines that the print orientation of the image is rotated when the subject area of the image is at the bottom of the image using a printer that has a degraded print quality area at the trailing edge of the print sheet of paper and prints the top of the image on the trailing edge of the print sheet in the normal print mode.

8. A printing apparatus comprising:

a print characteristics analyzing unit for determining print characteristics information of a printer according to a selected print setting for a print sheet type, the print characteristics information including a location on a print sheet of a degraded print quality area that occurs with the selected print setting for the print sheet type, wherein the print characteristics analyzing unit determines where the location of the degraded print quality area occurs by referring to print characteristics information stored in association with the print sheet type;

a print orientation determination unit for determining a print orientation of the image on the print sheet, based on the location of the degraded print quality area for the type of print sheet determined by the print characteristics analyzing unit, so that the degraded print quality area is located at a higher spatial frequency side of the image; and a printing unit for printing the image based on the print orientation determined by the print orientation determination unit.

9. The printing apparatus according to claim 8, wherein the print orientation determination unit determines that the print orientation of the image is rotated when spatial frequency is higher at the top of the image than at the bottom of the image using a printer that has a degraded print quality area at the trailing edge of a print sheet of paper and prints the top of the image on the trailing edge of the print sheet in a normal print mode, and the print orientation determination unit determines that the print orientation of the image is an original orientation of the image when spatial frequency is higher at the bottom of the image than at the top of the image using a printer that has a degraded print quality area at the trailing edge of the print sheet of paper and prints the top of the image on the leading edge of the print sheet in the normal print mode.

10. A printing method comprising:

a print characteristics analyzing step for determining print characteristics information of a printer based on a selected print setting for a print sheet type, the print characteristics information including a location on a print sheet of a degraded print quality area that occurs with the selected print setting for the print sheet type, wherein the print characteristics analyzing step determines whether the location of the degraded print quality area occurs towards either a leading edge or a trailing edge of the print sheet, by referring to print characteristics information stored in association with the print sheet type;

an image orientation determination step for determining an orientation of an image including a location of a tor and a bottom of the image;

a print orientation determination step for determining a print orientation of the image on the print sheet, based on the location of the degraded print quality area for the type of print sheet determined by the print characteristics analyzing step, and the orientation of the image determined by the image orientation determination step, by orienting the bottom of the image with the leading or trailing edge of the print sheet such that the bottom of the image is located at the degraded print quality area of the print sheet; and a printing step for printing the image based on the print orientation determined by the print orientation determination step.

11. The printing method according to claim 10, wherein the print orientation determination step determines the print orientation of the image to be an original orientation of the image when printing the image using a printer that has a degraded print quality area at the trailing edge of a print sheet of paper and prints the top of the image on the leading edge of the print sheet in a normal print mode, and the print orientation determination step determines that the print orientation of the image is rotated when printing the image using a printer that has a degraded print quality area at the trailing edge of the print sheet of paper and prints the top of the image on the trailing edge of the print sheet in the normal print mode.

12. The printing method according to claim 10, wherein
the image orientation determination step determines an original orientation of the image; and
wherein the print orientation determination step determines the print orientation of the image based on the original orientation of the image determined by the image orientation determination step.

13. The printing method according to claim 12, wherein the image orientation determination step determines the original orientation of the image based on attribute information of the image.

14. The printing method according to claim 12, wherein the image orientation determination step determines the original orientation of the image based on a result of face detection or subject recognition.

15. A computer readable medium containing computer-executable instructions for printing, the computer readable medium comprising:
computer-executable instructions for performing a print characteristics analyzing step for determining print characteristics information of a printer based on a selected print setting for a print sheet type, the print characteristics information including a location on a print sheet of a degraded print quality area that occurs with the selected print setting for the print sheet type, wherein the print characteristics analyzing unit determines whether the location of the degraded print quality area occurs towards either a leading edge or a trailing edge of the print sheet, by referring to print characteristics information stored in association with the print sheet type;
computer-executable instructions for performing an image orientation determination step for determining an orientation of an image including a location of a top and a bottom of an image;
computer-executable instructions for performing a print orientation determination step for determining a print orientation of the image on the print sheet based on the location of the degraded print quality area determined by the print characteristics analyzing step, and the orientation of the image determined by the image orientation determination step, by orienting the bottom of the image with the leading or trailing edge of the print sheet such that the bottom of the image is located at the degraded print quality area of the print sheet; and
computer-executable instructions for performing a printing step for printing the image based on the print orientation determined by the print orientation determination step.

16. A printing method comprising:
a print characteristics analyzing step for determining print characteristics information of a printer based on a selected print setting for a print sheet type, the print characteristics information including a location on a print sheet of a degraded print quality area that occurs with the selected print setting for the print sheet type, wherein the print characteristics analyzing step determines where the location of the degraded print quality area occurs by referring to print characteristics information stored in association with the print sheet type;
a subject area determination step for analyzing image data to determine a subject area of an image;
a print orientation determination step for determining a print orientation of an image on the print sheet, based on the subject area of the image determined in the subject area determination step and the location of the degraded print quality area for the type of print sheet determined by the print characteristics analyzing unit, so that a rate that the subject area of the image is included in the degraded print quality area is minimized; and
a printing step for printing the image based on the print orientation determined by the print orientation determination step.

17. The printing method according to claim 16, wherein the print orientation determination step determines that the print orientation of the image is an original orientation of the image when the subject area of the image is at the top of the image using a printer that has a degraded print quality area at the trailing edge of a print sheet of paper and prints the top of the image on the leading edge of the print sheet in a normal print mode, and the print orientation determination step determines that the print orientation of the image is rotated when the subject area of the image is at the bottom of the image using a printer that has a degraded print quality area at the trailing edge of the print sheet of paper and prints the top of the image on the trailing edge of the print sheet in the normal print mode.

18. A computer readable medium containing computer-executable instructions for printing, the computer readable medium comprising:
computer-executable instructions for performing a print characteristics analyzing step for determining print characteristics information of a printer based on a selected print setting for a print sheet type, the print characteristics information including a location on a print sheet of a degraded print quality area that occurs with the selected print setting for the print sheet type, wherein the print characteristics analyzing step determines where the location of the degraded print quality area occurs by referring to print characteristics information stored in association with the print sheet type;
computer-executable instructions for performing a subject area determination step for analyzing image data to determine a subject area of an image;
computer-executable instructions for performing a print orientation determination step for determining a print orientation of the image on the print sheet, based on the subject area of the image determined in the subject area determination step and the location of the degraded print quality area for the type of print sheet determined by the print characteristics analyzing step, so that a rate that the subject area of the image is included in a degraded print quality area is minimized; and computer-executable instructions for performing a printing step for printing the image based on the print orientation determined by the print orientation determination step.

19. A printing method comprising:

a print characteristics analyzing step for determining print characteristics information of a printer according to a selected print setting for a print sheet type, the print characteristics information including a location on a print sheet of a degraded print quality area that occurs with the selected print setting for the print sheet type, wherein the print characteristics analyzing step determines where the location of the degraded print quality area occurs by referring to print characteristics information stored in association with the print sheet type;

a print orientation determination step for determining a print orientation of the image on the print sheet, based on the location of the degraded print quality area for the type of print sheet determined by the print characteristics analyzing step, so that the degraded print quality area is located at a higher spatial frequency side of the image; and a printing step for printing the image based on the print orientation determined by the print orientation determination step.

20. The printing method according to claim 19, wherein the print orientation determination step determines that the print orientation of the image is rotated when spatial frequency is higher at the top of the image than at the bottom of the image using a printer that has a degraded print quality area at the trailing edge of a print sheet of paper and prints the top of the image on the trailing edge of the print sheet in a normal print mode, and the print orientation determination step determines that the print orientation of the image is an original orientation of the image when spatial frequency is higher at the bottom of the image than at the top of the image using a printer that has a degraded print quality area at the trailing edge of the print sheet of paper and prints the top of the image on the leading edge of the print sheet in the normal print mode.

21. A computer readable medium containing computer-executable instructions for printing, the computer readable medium comprising:

computer-executable instructions for performing a print characteristics analyzing step for determining print characteristics information of a printer according to a selected print setting for a print sheet type, the print characteristics information including a location on a print sheet of a degraded print quality area that occurs with the selected print setting for the print sheet type, wherein the print characteristics analyzing step determines where the location of the degraded print quality area occurs by referring to print characteristics information stored in association with the print sheet type;

computer-executable instructions for performing a print orientation determination step for determining a print orientation of the image on the print sheet based on the location of the degraded print quality area for the type of print sheet determined by the print characteristics analyzing step, so that the degraded print quality area is located at a higher spatial frequency side of the image; and a printing step for printing the image based on the print orientation determined by the print orientation determination step.

\* \* \* \* \*